United States Patent [19]

Wrege et al.

[11] Patent Number: 4,670,697
[45] Date of Patent: Jun. 2, 1987

[54] LOW COST, LOAD AND SPEED SENSITIVE MOTOR CONTROL STARTING CIRCUIT

[75] Inventors: Richard A. Wrege, Muskego; Steven F. Chmiel, Milwaukee; Victor A. Murn, Muskego, all of Wis.

[73] Assignee: PT Components, Inc., Milwaukee, Wis.

[21] Appl. No.: 885,087

[22] Filed: Jul. 14, 1986

[51] Int. Cl.$^4$ .............................................. H02P 1/44
[52] U.S. Cl. .................................... 318/786; 318/785
[58] Field of Search ....................... 318/786, 785, 778

[56]  References Cited
U.S. PATENT DOCUMENTS

| | | | |
|---|---|---|---|
| 3,421,064 | 1/1969 | Phillips | 318/786 |
| 3,671,830 | 6/1972 | Kruper | 318/786 |
| 3,761,792 | 9/1973 | Whitney et al. | 318/786 |
| 3,792,324 | 2/1974 | Suarez et al. | 318/786 |

Primary Examiner—David Smith, Jr.
Attorney, Agent, or Firm—Andrus, Sceales, Starke & Sawall

[57] ABSTRACT

A low cost, low part content single phase AC induction motor control starting circuit is provided which is speed sensitive, load sensitive and AC line voltage fluctuation insensitive. A quad comparator chip (61-64) senses and compares relative magnitudes of main and auxiliary winding voltages (30, 32 and 42) to de-energize the auxiliary winding (2) at cut-out speed, and automatically re-energize the auxiliary winding (2) at cut-in speed to accelerate or restart the motor from a stall or overload condition. Simplified power supply and voltage detection circuitry is also disclosed.

8 Claims, 4 Drawing Figures

LOW COST, LOAD AND SPEED SENSITIVE MOTOR CONTROL STARTING CIRCUIT

BACKGROUND AND SUMMARY OF THE INVENTION

The invention relates to disconnect switches for use with the start or auxiliary winding of a single phase AC induction motor. The invention particularly relates to improvements in reduced cost and part content over commonly owned co-pending allowed U.S. application Ser. No. 680,489, filed Dec. 11, 1984, "Load and Speed Sensitive Motor Control Starting Circuit", Shemanske et al, hereby incorporated herein by reference.

The present invention eliminates the flip flop of the above noted Shemanske et al circuit and uses the fourth remaining comparator of the quad comparator chip with a hard wired configuration to perform the flip flop function. The invention also provides simplified main and auxiliary winding voltage detectors and power supply circuitry, with reduced part content.

DETAILED DESCRIPTION

As known in the art, a single phase AC induction motor has a main winding for running the motor, and a start or auxiliary winding for a capacitor start or capacitor start-run type motor and/or for starting the motor wherein the auxiliary winding is energized when starting the motor from rest and then disconnected at a given motor speed. The fields in the main and auxiliary windings are phase shifted, for example by capacitance, inductance, resistance or the like, to establish a rotating magnetic field for starting and/or running torque.

Figure 1:
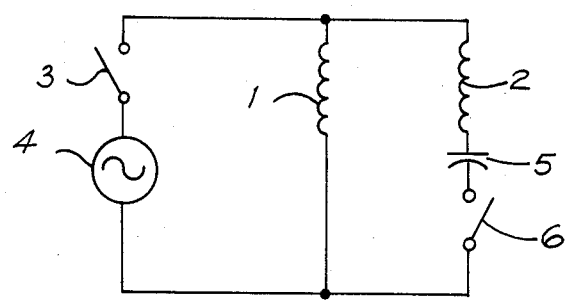
FIG. 1 schematically shows a typical environment in which the preferred embodiment of the invention is used.

FIG. 1 shows main winding 1 and auxiliary 2 of a single phase AC induction motor connectable through a switch 3 to an AC power source 4. Capacitor 5 provides the phase shift for starting torque. When the motor reaches a given threshold speed, switch 6 is opened to disconnect auxiliary winding 2 from power source 4.

Figure 2:
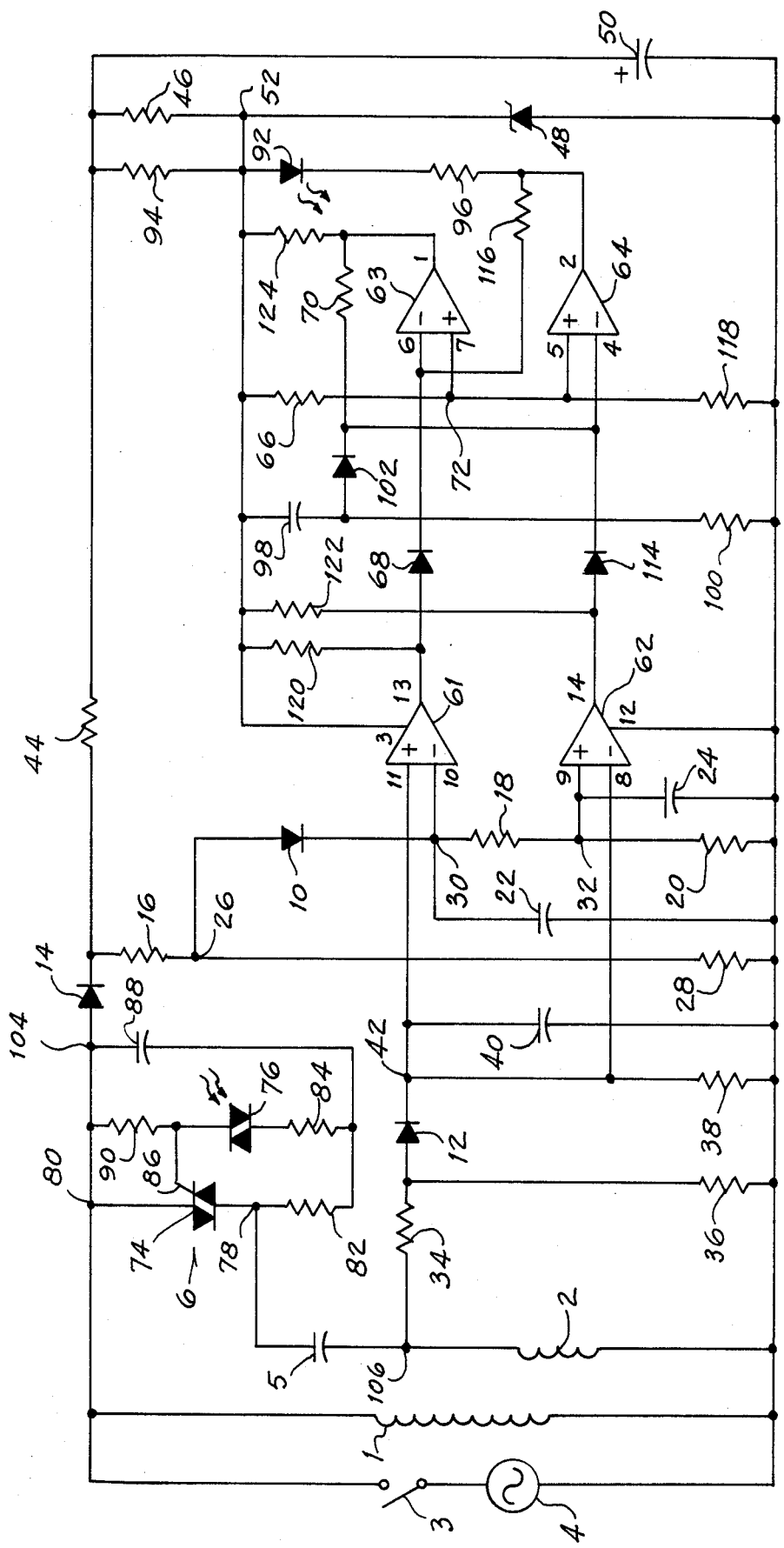
FIG. 2 is a circuit diagram of a motor control starting circuit in accordance with the invention.

FIG. 2 shows circuitry in accordance with the invention for controlling disconnect switch 6. A main voltage detector circuit including diode 10 is connected across main winding 1 for sensing the magnitude of the AC main winding voltage. An auxiliary voltage detector circuit including diode 12 is connected across auxiliary winding 2 for sensing the magnitude of the AC auxiliary winding voltage.

Main winding voltage is sensed through rectifying diodes 14 and 10 and resistors 16, 18, 20 and 28 and filtered by capacitors 22 and 24. The voltage at node 26 is reduced by the voltage divider provided by resistor 16 on one side of the node and the parallel combination of resistor 28 and series resistors 18 and 20 on the other side of the node. The voltage at node 30 is the voltage at node 26 less the drop across diode 10. The voltage at node 32 is the voltage at node 30 reduced by the voltage divider provided by resistors 18 and 20. The voltages at nodes 30 and 32 are derived from the AC line and provide reference voltages relative thereto for the cut-out comparator 61 and for the cut-in restart or comparator 62, to be described. These cut-out and cut-in reference voltages vary with the line voltage and thus provide compensation of same, and allow the cut-out speed and the cut-in restart speed of the motor to be relatively independent of line voltage. The cut-in restart voltage at node 32 is less than the cut-out voltage at node 30.

The auxiliary winding voltage is reduced by the voltage divider network provided by resistors 34 and 36 and sensed through half wave rectifying diode 12 and resistor 38 and filtered by capacitor 40. The sensed auxiliary winding voltage at node 42 is supplied to both the cut-out comparator 61 and the cut-in restart comparator 62 for comparison against the respective floating main winding AC line reference voltages.

A half wave rectified DC power supply is provided from the AC source through diode 14 and resistors 44, 46 and 94 clamped by zener diode 48 and filtered by capacitor 50 to provide a fixed DC reference voltage at node 52, in this case 12 volts, for powering the control circuitry, to be described.

As in the above noted Shemanske et al application, the circuitry in FIG. 2 utilizes a quad comparator chip, such as an LM339, wherein manufacturer designated pin number assignments are shown for clarity. First, second, third and fourth comparators on the chip are respectively shown at 61, 62, 63 and 64. In the present application, the flip flop 21 in FIG. 4 of the noted Shemanske et al application is eliminated, and the flip flop function is provided by a hard wire connection between the comparators, to be described.

The minus input at pin 10 of comparator 61 is used as the reference input and is connected to node 30. The plus input at pin 11 of comparator 61 is the comparing input and is connected to node 42. When the magnitude of the auxiliary winding voltage at node 42 increases to or above a predetermined cut-out value relative to the magnitude of the main winding voltage at node 30 as a function of motor speed, the output of comparator 61 at pin 13 provides a turn-off signal by going high. Third comparator 63 has a plus input at pin 7 which is used as the reference input and is connected through resistor 66 to the regulated DC supply at node 52. The minus input at pin 6 of comparator 63 is the comparing input and receives the turn-off high signal from comparator 61 through diode 68, which high signal at pin 6 causes the output of comparator 63 at pin 1 to go low. Comparator 63 compares the output of comparator 61 against the reference voltage from node 52 and outputs a low turn-off signal at pin 1 when the high turn-off signal at pin 6 rises in a given polarity direction to or above a predetermined value relative to the reference voltage at pin 7. The low turn-off signal at pin 1 is supplied through resistor 70 to the fourth comparator 64 at pin 4 which is the minus input and is used as the comparing input for comparator 64. The plus input of comparator 64 at pin 5 is the reference input and is connected with pin 7 of comparator 63 at a common node 72 and connected through resistor 66 to the regulated DC supply at node 52. When output pin 1 of comparator 63 goes low, the input pin 4 of comparator 64 likewise goes low, and in turn output pin 2 of comparator 64 goes high which provides a turn-off signal to switch 6, which in turn disconnects auxiliary winding 2 from AC source 4, to be described. Voltage comparator 64 compares at input pin 4 the output of comparator 63 against the reference voltage at pin 5 and outputs the high turn-off signal at pin 2 when the low turn-off signal from comparator 63 decreases in a given polarity direction to or below a predetermined value relative to the reference voltage at pin 5.

Switch 6 is an optically isolated triac driver, as know in the art, for example an MOC3023, and will be only briefly described. Triac 74 is in series with capacitor 5 and auxiliary winding 2 across AC source 4, and has a gate circuit including a light responsive triac 76 for controlling conduction of triac 74. Triac terminal 78 is connected to one plate of capacitor 5 and triac terminal 80 is connected to AC source 4. When terminal 78 is positive with respect to terminal 80, and triac 74 is conductive, current flows from terminal 78 through limiting resistors 82 and 84 and through triac 76 to the gate 86 of triac 74 to bias the latter into conduction such that starting current may flow through triac 74 between terminals 78 and 80. Capacitor 88 and resistor 82 provide a snubber network for optotriac driver 76. Resistor 90 provides gate stability. Light responsive triac 76 is optically coupled to LED 92 and is activated by the latter to initiate conduction of triac 76 and in turn conduction of triac 74. When output pin 2 of comparator 64 goes low, a circuit is completed from the regulated DC supply at node 52 through LED 92 and resistor 96, whereby light is emitted from LED 92 to light responsive triac 76 to activate the latter.

Initialization means is provided by an RC timing circuit including capacitor 98 and resistor 100. At initial turn-on upon closure of switch 3, a positive pulse is generated from node 52 through capacitor 98 and diode 102 to input pin 4 of comparator 64 causing the latter's output at pin 2 to go low which turns on LED 92 and triacs 76 and 74, hence connecting auxiliary winding 2 to AC power source 4 at initial energization of the motor. When the motor reaches the cut-out speed, the voltage at node 42 at input pin 11 of comparator 61 rises to the predetermined value relative to the voltage at node 30 at input pin 10 of comparator 61, and the output of comparator 61 at pin 13 goes high, which turn-off signal is supplied to input pin 6 of comparator 63 causing the latter's output at pin 1 to go low, which low turn-off signal is supplied through resistor 70 to input pin 4 of comparator 64 causing the latter's output at pin 2 to go high, which high turn-off signal prevents conduction through diode 92 and hence turns off triac 76 which turns off triac 74, thus disconnecting auxiliary winding 2 from AC source 4.

Figure 3:
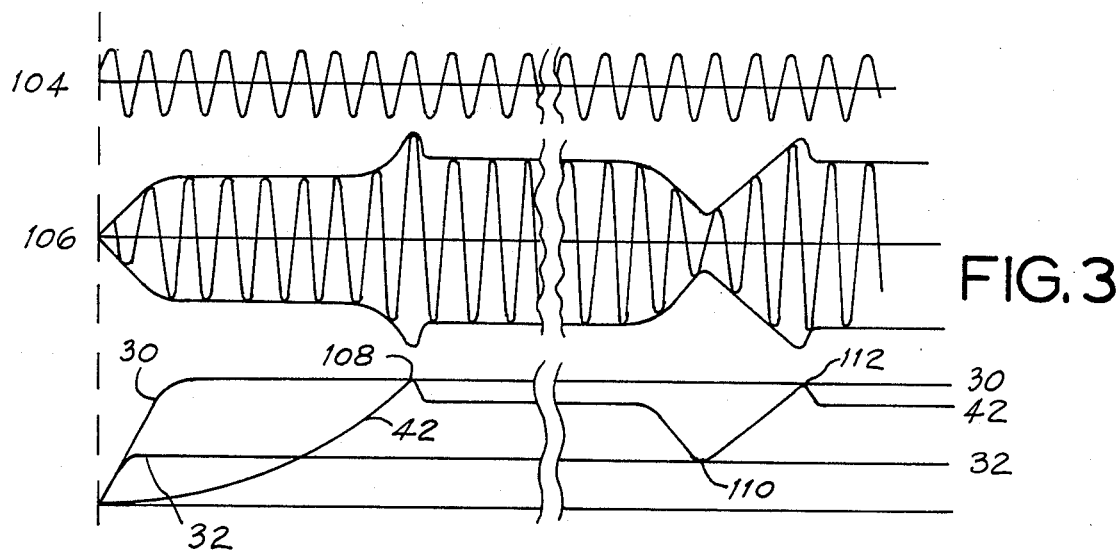
FIG. 3 is a wave form diagram illustrating operation of the circuitry of FIG. 2.

FIG. 3 shows the AC line voltage across main winding 1 as appearing at node 104, and also shows the auxiliary winding voltage as appearing at node 106. FIG. 3 also shows the filtered half wave rectified AC line cut-out reference voltage at node 30, the filtered half wave rectified AC line cut-in reference voltage at node 32, and the filtered half wave rectified auxiliary winding voltage at node 42. At cut-out, the filtered half wave rectified auxiliary winding voltage at node 42 rises to the filtered half wave rectified AC line cut-out reference voltage at node 30, as shown at cross-over 108, and auxiliary winding 2 is disconnected from AC source 4 as above described. The magnitudes of the main and auxiliary winding voltages are compared, as above described, and auxiliary winding 2 is disconnected when the auxiliary winding voltage at node 42, including the components from AC source 4 and from rotationally induced voltage due to rotation of the rotor, increases to a predetermined cut-out value such as 108 relative to the main winding voltage at node 30.

After auxiliary winding 2 is disconnected from AC source 4, there is still a voltage appearing across auxiliary winding 2 due to the rotation of the rotor which rotationally induces voltage in auxiliary winding 2. Restart or cut-in comparator 62 senses rotationally induced voltage in the auxiliary winding during running of the motor after starting, i.e., after auxiliary winding 2 is disconnected from AC source 4. Cut-in or restart comparator 62 detects a given decrease in the induced auxiliary winding voltage, as at cut-in inverse crossover 110, FIG. 3, corresponding to a stall or overload condition of the motor, at which time comparator 62 generates turn-on signal at its output pin 14 to turn on switch 6 and reconnect auxiliary winding 2 to AC source 4 to thus re-energize the auxiliary winding and accelerate the motor from its stall condition. The motor is automatically accelerated or restarted, without manual intervention. As the motor gains speed, the magnitude of the waveform at node 42 again increases to the predetermined value relative to the waveform at node 30, as at cross-over 112, and switch 6 is turned off, again disconnecting auxiliary winding 2 from AC source 4 after the automatic restart.

When the rotationally induced voltage across auxiliary winding 2 at node 42 and input pin 8 of comparator 62 decreases to a predetermined cut-in value relative to the magnitude of the main winding voltage at node 32 and input pin 9 as a function of motor speed, the output of comparator 62 at pin 14 goes high and provides a turn-on signal. This turn-on signal is supplied through diode 114 to input pin 4 of comparator 64 causing the latter's output at pin 2 to go low which in turn enables conduction through LED 92 and hence activates triacs 76 and 74 to connect auxiliary winding 2 to AC source 4. The low state at output pin 2 of comparator 64 is also applied through resistor 116 to input pin 6 of comparator 63 to cause output pin 1 to go high, which high level is applied through resistor 70 to input pin 4 of comparator 64 to complete the flip flop or latching action and provide a latched condition. Resistor 118 provides a voltage divider network with resistor 66 to provide a reduced voltage level at node 72. Resistors 120, 122 and 124 provide pull-up resistors at the outputs of the respective comparators.

Figure 4:
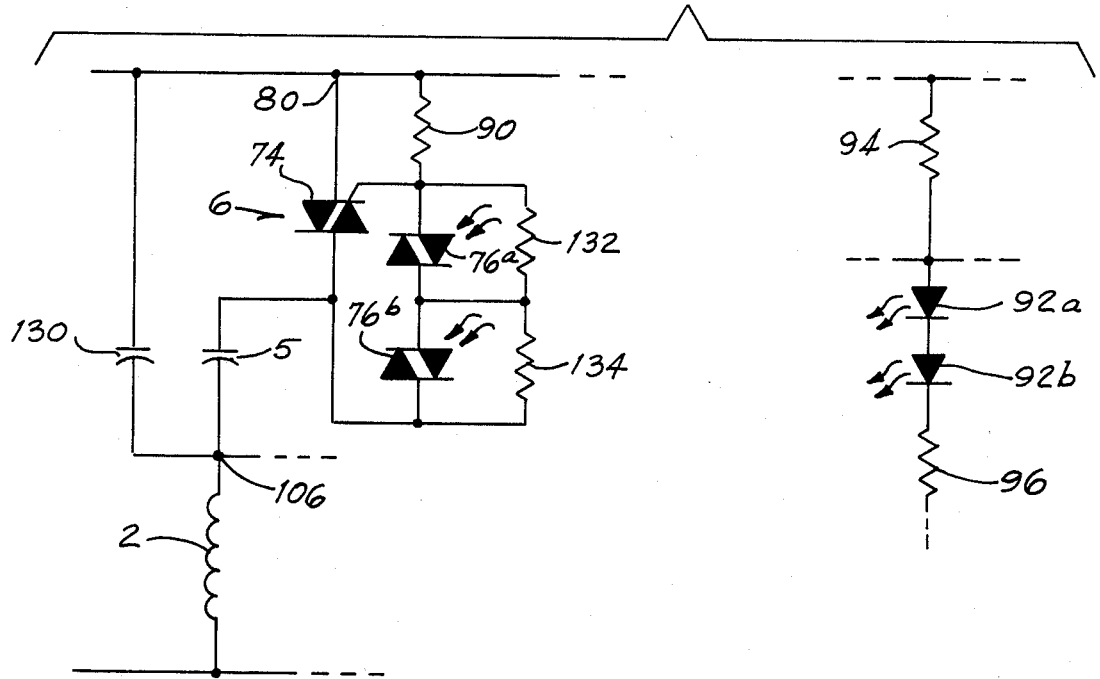
FIG. 4 is a partial isolated circuit diagram of a modification of FIG. 2.

FIG. 4 shows a further application of the invention in a capacitor run motor with a run capacitor 130 connected between nodes 80 and 106 in series with auxiliary winding 2, where like reference numerals are used from FIG. 2 where appropriate to facilitate clarity. A higher voltage withstand capability is provided in the gate circuit of the power triac 74 by a pair of light responsive triacs 76a and 76b in series and optically triggered into conduction by respective LEDs 92a and 92b in series between resistors 94 and 96. Capacitor 88 may be eliminated because of the presence of parallel capacitor 130 already in the circuit. Resistors 132 and 134 equalize and share voltage spikes or transients to prevent unwanted dv/dt turn-on.

It recognized that various equivalents, alternatives and modifications are possible within the scope of the appended claims.

We claim:

1. In a single phase AC induction motor having a main winding and an auxiliary winding both connectable to an AC power source, and having a switch for disconnecting said auxiliary winding from said AC source, an improved control circuit for said switch comprising:
  main voltage detector means for sensing the magnitude of the AC main winding voltage;
  auxiliary voltage detector means for sensing the magnitude of the AC auxiliary winding voltage;
  a first voltage comparator responsive to said main and auxiliary voltage detector means and comparing the magnitude of the auxiliary winding voltage against the magnitude of the main winding voltage and outputting a turn-off signal when the magnitude of the auxiliary winding voltage increases to a predetermined cutout value relative to the magnitude of the main winding voltage as a function of motor speed;
  a second voltage comparator responsive to said main and auxiliary voltage detector means and comparing the magnitude of the auxiliary winding voltage against the magnitude of the main winding voltage and outputting a turn-on signal when the magnitude of the auxiliary winding voltage decreases to a predetermined cut-in value relative to the magnitude of the main winding voltage as a function of motor speed, said predetermined cut-in value being a stall or overload condition voltage derived from rotationally induced voltage in said auxiliary winding during running of said motor after starting, said predetermined cut-in value being less than said predetermined cut-out value;
  a third voltage comparator responsive to the output of said first voltage comparator to output a turn-off signal in response to said turn-off signal from said first voltage comparator;
  a fourth voltage comparator responsive to the output of said second voltage comparator and responsive to the output of said third voltage comparator, said fourth voltage comparator being responsive to said turn-off signal from said third voltage comparator to output a turn-off signal to said switch to disconnect said auxiliary winding from said AC source, said fourth voltage comparator being responsive to said turn-on signal from said second voltage comparator to output a turn-on signal to said switch to connect said auxiliary winding to said AC source.

2. The invention according to claim 1 comprising:
  power supply means connected to said AC source across said main winding and providing rectified voltage as the power source for each of said comparators, and also providing a reference voltage;
and wherein:
  said third voltage comparator compares the output of said first voltage comparator against said reference voltage and outputs a turn-off signal responsive to said turn-off signal from said first voltage comparator rising in a given polarity direction to a predetermined value relative to said reference voltage;
  the output of said second voltage comparator and the output of said third voltage comparator are connected together at a common node;
  said fourth voltage comparator compares the voltage at said common node against said reference voltage and outputs said turn-off signal to said switch when the voltage at said common node decreases in a given polarity direction to a predetermined turn-off value relative to said reference voltage, and wherein said fourth voltage comparator outputs said turn-on signal to said switch when the voltage at said common node increases in a given polarity direction to a predetermined turn-on value relative to said reference voltage.

3. The invention according to claim 2 wherein the output of said fourth voltage comparator is applied to an input of said third voltage comparator which is responsive to said output of said first voltage comparator, such that said turn-on signal from said fourth voltage comparator is also applied to said third voltage comparator such that the latter outputs said turn-on signal therefrom which is applied to an input of said fourth voltage comparator which also receives said output of said second voltage comparator to insure that said fourth voltage comparator continues to generate said turn-on signal from the output thereof, and such that said turn-off signal from said output of said fourth voltage comparator is also applied to said input of said third voltage comparator which receives said output of said first voltage comparator such that said third voltage comparator outputs said turn-off signal to said input of said fourth voltage comparator which also receives said output of said second voltage comparator and insures that said fourth voltage comparator continues to generate said turn-off signal, to provide latching flip-flop action.

4. The invention according to claim 3 wherein said main voltage detector means comprises first and second voltage divider networks, and wherein said first voltage comparator compares auxiliary winding voltage against the voltage across said first voltage divider network, and said second voltage comparator compares auxiliary winding voltage against the voltage across said second voltage divider network, and wherein the voltage across said second voltage divider network is less than the voltage across said first voltage divider network.

5. The invention according to claim 4 wherein said main voltage detector means comprises a diode, and wherein the reference voltage for each of said first and second voltage comparators is supplied through the same said diode, the cathode of said diode providing said voltage across said first voltage divider network at said first voltage comparator, the voltage across said second voltage divider network at said second voltage comparator being provided through a resistor from said cathode of said diode.

6. The invention according to claim 4 wherein:
  each of said first, second, third and fourth voltage comparators has plus and minus inputs;
  the minus input of said first voltage comparator is a reference input and is connected to said first voltage divider network;
  the plus input of said second voltage comparator is a reference input and is connected to said second voltage divider network;
  the plus input of said first voltage comparator and the minus input of said second voltage comparator are comparing inputs and are connected to a common node and connected to said auxiliary voltage detector means;
  the plus inputs of said third and fourth voltage comparators are reference inputs and are connected to a common node and connected to said power supply means for receiving said reference voltage;
  the minus input of said third voltage comparator is a comparing input and is responsive to the output of said first voltage comparator; and
  the minus input of said fourth voltage comparator is a comparing input and is responsive to the output of said second voltage comparator.

7. The invention according to claim 1 comprising initialization means sensing main winding voltage at initial energization of said motor, said fourth voltage comparator being responsive to said initialization means to output said turn-on signal to said switch to connect said auxiliary winding to said AC source.

8. The invention according to claim 7 wherein said initialization means comprises an RC timing circuit including a capacitor charged at initial energization of said motor, which charge provides an initial turn-on pulse for said fourth voltage comparator.

* * * * *